United States Patent [19]

Nakagawa et al.

[11] Patent Number: 4,665,108

[45] Date of Patent: May 12, 1987

[54] FRICTION MATERIAL USING IRON POWDER

[75] Inventors: Mitsuhiko Nakagawa; Fumiaki Nitto, both of Itami, Japan

[73] Assignee: Sumitomo Electric Industries, Ltd., Osaka, Japan

[21] Appl. No.: 797,252

[22] Filed: Nov. 8, 1985

[30] Foreign Application Priority Data

Nov. 12, 1984 [JP]  Japan .................................. 59-238196

[51] Int. Cl.$^4$ ............................................... C08J 5/14
[52] U.S. Cl. .................................... 523/152; 523/153; 523/155; 523/156; 523/157; 523/158
[58] Field of Search ............... 523/149, 150, 152, 153, 523/155, 156, 157, 158, 159

[56] References Cited

FOREIGN PATENT DOCUMENTS

| | | | |
|---|---|---|---|
| 55-157673 | 12/1980 | Japan . | |
| 55-157674 | 12/1980 | Japan . | |
| 57-111373 | 7/1982 | Japan . | |
| 57-124140 | -8/1982 | Japan . | |
| 59-24778 | 2/1984 | Japan | 523/149 |
| 59-25864 | 2/1984 | Japan | 523/149 |
| 59-24779 | 2/1984 | Japan | 523/149 |
| 59-155484 | 9/1984 | Japan . | |

*Primary Examiner*—Lewis T. Jacobs
*Attorney, Agent, or Firm*—Cushman, Darby & Cushman

[57] ABSTRACT

A friction material having particular use in brake pads for motor vehicles. The material includes iron powder as its chief constituent. In addition, the material contains phosphorous (P) of 0.02% or more of sulfur (S) of 0.02% or more or combined P and S of 0.03% or more.

17 Claims, No Drawings

FRICTION MATERIAL USING IRON POWDER

BACKGROUND OF THE INVENTION

This invention relates to friction materials such as those used in brakes and clutches of motor vehicles such as trucks and automobiles. More particularly, the invention provides to a friction material using iron (steel) powder for use in disk and drum brakes.

Generally, friction materials for brakes contain asbestos serving as a strengthening material, ceramic (inorganic) powders such as of oxides and carbides serving as friction coefficient (hereinafter referred to as $\mu$) increasing agents, and graphite and soft metal serving as friction adjusting agents, these ingredients being bound by an organic binder such as, for example, a resin. However, the use of asbestos and also some inorganic powders have been criticized because of the risks associated with their manufacture and use. Thus, it has been proposed to replace asbestos by steel fiber as a strengthening material and some or all of the ceramic (inorganic) powder by iron powder as a friction coefficient increasing agent, it being noted that a sintered alloy type friction material has been used in some two-wheeled vehicles.

For example, Japanese Patent Application Laid-Open No. 157673/1980 states that " . . . the conventional means of adding ceramic powder in order to increase friction coefficient $\mu$ is not desirable since it grinds a mating material . . . " and proposes a friction material " . . . which has increased $\mu$ by using high carbon iron powder while using steel fiber or inorganic fiber as a strengthening material . . . " while Japanese Patent Application Laid-Open No. 11373/1982 proposes a friction material using steel fiber and atomized iron powder. U.S. Pat. No. 3,835,118 proposes a friction material using sponge iron powder and steel fiber (including the case of using no steel fiber), and British Patent No. 1,206,554 proposes a friction material using short fiber powder-like steel wool and white cast iron powder. Further, British Patent No. 2,073,782A proposes that a sintered alloy using iron powder be used as a friction material. Thus, a friction material which uses iron powder or a combination of iron powder and steel wool has been known. In this connection, it is to be noted that since iron powder is generally less expensive than steel fiber, it is desirable that in a friction material which uses both, the amount of iron powder be increased while the amount of steel fiber is decreased.

It is necessary for friction materials to have high $\mu$. To increase $\mu$, it is known to incorporate in a binder an organic material similar in nature to rubber to thereby increase the actual area of contact with a mating member such as a brake. Using such a binder, however, the heat resistance of the friction material does not increase; rather, $\mu$ is decreased when the friction material is used under high temperature conditions particularly at high speeds.

Another way to increase $\mu$ is to incorporate in a friction material a harder material than a mating member so as to expect a scratching force to be produced on the mating member during braking. This means, however, is not desirable since it increases wear on the mating member and forms a remote cause of creaks produced during braking.

SUMMARY OF THE INVENTION

It is therefore an objective of the present invention to provide a friction material having a high friction coefficient, a low attack on a mating member with which it is used and that is inexpensive to produce.

Generally, phosphorus (P) and (S) sulfur are impurities for steel which cause a decrease in the steel's strength, toughness and workability. Thus it is important to minimize the P and S contents of the steel. The same is true of iron powders used in friction materials, and the P and S contents of atomized iron powder and sponge iron powder which have heretofore been used have each been 0.02% or less.

We have accomplished the present invention by finding that P and S which mix in a friction material and which are minor constituents of iron powder increase the friction coefficient and decrease wear on a mating member, that is, the greater the P and S contents, the higher $\mu$ (friction coefficient) becomes and the greater the effect of decreasing wear on a mating member.

This invention provides a friction material which has eliminated the drawback of the aforesaid conventional friction material containing iron powder by using an iron powder which contains 0.02% or more of P (phosphorus) or 0.02% or more of S (sulfur) or a total of 0.03% or more of (P+S).

In this case, besides iron powder, steel fiber and the like may be mixed, and aramid fiber, mica and the like may also be incorporated. Further, the invention is also applicable to a sintered alloy friction material.

The iron powder to be used has a particle size preferably of 20–200 mesh, though not limited thereto, and the iron powder may be flaky or granular while retaining the same effect.

The following description of the presently preferred embodiment refers to a pad containing a total of about 60 wt% of iron powder and steel fiber, but the invention is not limited thereto; it goes without saying that the iron content may be reduced and aramid fiber, mica and glass fiber may be used together with or substituted for steel fiber.

DETAILED DESCRIPTION OF THE PREFERRED EMBODIMENT(S)

The following is a detailed description of the presently preferred embodiment(s) of the invention. These specific embodiments constitute the best mode known to the inventors at the time of the filing of this application for practicing the invention. The description of this invention, as set forth in this application including all of its parts, is intended to enable one of ordinary skill in the art to which this invention pertains to practice the invention.

35 wt% iron powder, 25 wt% steel fiber, 10 wt% phenolic resin, 10 wt% $BaSO_4$, 19 wt% graphite, and 1 wt% $SiO_2$ were mixed together and pressed at ordinary temperature under a pressure of 350 kg/cm$^2$ for 1 minute by a press machine for preforming to the shape of a friction pad for automobile disk brakes. The resulting preform was then subjected to main forming at 150° C. under a pressure of 300 kg/cm$^2$ for 10 minutes using the same press machine, followed by 15 hours of after-curing in a furnace at 250° C. The friction pad thus obtained was ground to a predetermined thickness, the ground pad being bonded to a back plate of metal, thereby providing a pad assembly.

The iron powder used were as shown in Table 1.

TABLE 1

| Symbol | Constituents of Iron Powder | | |
|---|---|---|---|
| | S (%) | P (%) | C (%) |
| A | 0.004 | 0.012 | 0.03 |
| B | 0.021 | 0.013 | 0.03 |
| C | 0.005 | 0.020 | 0.03 |
| D | 0.013 | 0.018 | 0.03 |
| E | 0.024 | 0.085 | 0.04 |
| F | 0.021 | 0.023 | 0.30 |
| G | 0.022 | 0.021 | 0.43 |
| H | 0.008 | 0.019 | 0.70 |

The assemblies using the aforesaid various iron powders were tested using a dynamometer, while simulating the 1500-cc automobile, the tests conducted being as follows.

(1) Rubbing 200 times of braking at a deceleration rate of 0.3 g from 65 km/H to 0 (stoppage)
Pad temperature before braking: 120° C.

(2) Effectiveness Test 50 km/H→0 (stoppage)
100 km/H→0 (stoppage)
130 km/H→0 (stoppage)
Deceleration 0.6 g, 5 times each
Pad temperature before braking: 100° C.
Friction coefficient measured: $\mu$ (3) Test on Attack on Mating Member 50 km/H→0 (stoppage)
Deceleration: 0.05 g
4000 times of braking
Pad temperature before braking: 50° C.

The amount of wear of the mating member was measured.

The test results were as shown in Table 2.

TABLE 2

| | | Test Results | | | |
|---|---|---|---|---|---|
| | | Friction coefficient $\mu$ | | | Amount of wear of mating member $\times 10^{-3}$ m/m |
| | Sample | 50 km/H | 100 km/H | 130 km/H | |
| Conventional product | A | 0.35 | 0.32 | 0.29 | 29 |
| Present inventive product | B | 0.40 | 0.36 | 0.33 | 21 |
| | C | 0.39 | 0.36 | 0.33 | 24 |
| | D | 0.41 | 0.37 | 0.34 | 26 |
| | E | 0.44 | 0.41 | 0.36 | 18 |
| | F | 0.44 | 0.40 | 0.37 | 31 |
| | G | 0.46 | 0.42 | 0.39 | 55 |
| Conventional product | H | 0.47 | 0.44 | 0.40 | 73 |

It is seen from the above results that in the case of the samples A-D where the C content is 0.03%, the greater the S or P content, the greater is friction coefficient and the smaller the amount of wear of the mating member. Particularly, the sample E where the C content is 0.04% indicates that even if the C content is increased, excellent results can be attained in that an increase in friction coefficient and a decrease in attack on the mating member are obtained, on condition that the S and P contents are increased.

In the case of the samples F and G where the C content is 0.3% and 0.43%, respectively, and where the S and P contents are large, it is seen that the friction coefficients are high since the iron powders used have high hardness and that in spite of this the attack on the mating member is within the allowable range. On the contrary, the sample H having a high C content has a high attack on the mating member, aside from the question of friction coefficient.

It is seen from the above results that the presence of large S and P contents has the satisfactory effect of reducing attack on the mating member while increasing friction coefficient. This effect is remarkable particularly where C is 0.5% or less.

As has so far been described in detail, the present invention relates to a friction material for vehicles containing iron powder as an ingredient and provides a friction material having a high friction coefficient and a low attack on a mating member at low cost by simply using an iron powder which contains much S and P, which iron powder has not heretofore been used. Thus, the invention is very useful.

Other embodiments and modifications of the present invention will be apparent to those of ordinary skill in the art having the benefit of the teachings presented in the foregoing description and drawings. It is therefore to be understood that this invention is not to be unduly limited and such modifications are intended to be included within the scope of the claims.

What is claimed is:

1. A phenolic resin based friction material body suitable for a vehicle, brake or clutch including iron powder, wherein said iron powder consists essentially of at least 0.02% by weight sulfur.

2. A phenolic resin based friction material body suitable for a vehicle, brake or clutch including iron powder, wherein said iron powder consists essentially of at least 0.02% by weight phosphorus.

3. A phenolic resin based friction material body suitable for a vehicle, brake or clutch including iron powder, wherein said iron powder consists essentially of at least 0.03% by weight sulphur and phosphorus.

4. A phenolic resin based friction material body suitable for a vehicle brake or clutch including iron powder, wherein said iron powder contains at least 0.02 percent by weight sulfur, or at least 0.02 percent by weight phosphorus, or at least 0.03 percent by weight of both sulfur and phosphorus.

5. A phenolic resin based friction material body as in claim 4, wherein said iron powder further comprises less than or equal to 0.5 percent by weight carbon.

6. A phenolic resin based friction material body as in claim 4, wherein said body is about 60 percent by weight iron powder and steel fiber.

7. A phenolic resin based friction material body as in claim 4, wherein said body is about 60 percent by weight iron powder and fiber material; and wherein said fiber material is selected from the group consisting of steel, aramid, mica, and glass.

8. A phenolic resin based friction material body as in claim 7, wherein said fiber material consists of steel and a member of the group consisting of aramid, mica, and glass.

9. A phenolic resin based friction material body as in claim 4, wherein said body is about 35 percent by weight iron powder.

10. A phenolic resin based friction material body as in claim 4, wherein said body is about 10 percent by weight phenolic resin.

11. A phenolic resin based friction material body as in claim 4, wherein said body is about 10% by weight BaSO$_4$.

12. A phenolic resin based friction material body as in claim 4, wherein said body is about 19% by weight graphite.

13. A phenolic resin based friction material body as in claim 4, wherein said body further comprises BaSO$_4$, graphite, SiO$_2$, and steel fiber.

14. A phenolic resin based friction material body as in claim 4, wherein said body further comprises BaSO$_4$, graphite, SiO$_2$, and fiber material; and wherein said fiber material is selected from the group consisting of steel, aramid, mica, and glass.

15. A phenolic resin based friction material as in claim 14, wherein said fiber material consists of steel and a member of the group consisting of aramid, mica, and glass.

16. A phenolic resin based friction material body for a vehicle brake or clutch including iron powder, wherein said iron powder contains at least 0.02 percent by weight sulfur, or at least 0.02 percent by weight phosphorus, or at least 0.03 percent by weight of both sulfur and phosphorus, and wherein said body consists of in approximate percents by weight of said body:

iron powder: 35%
steel fiber: 25%
phenolic resin: 10%
BaSO$_4$: 10%
graphite: 19%
SiO$_2$: 1%

17. A phenolic resin based friction material body as in claim 12, wherein said iron powder further comprises less than or equal to 0.05 percent by weight carbon.

* * * * *